United States Patent [19]

Nielsen

[11] Patent Number: 5,369,698
[45] Date of Patent: Nov. 29, 1994

[54] WOODPECKER SIMULATING TELEPHONE RINGING DEVICE

[76] Inventor: Donald C. Nielsen, 10260 W. Fairbanks Ave., Beach Park, Ill. 60099

[21] Appl. No.: 865,284

[22] Filed: Apr. 8, 1992

[51] Int. Cl.⁵ .............................................. H04M 1/00
[52] U.S. Cl. ..................................... 379/373; 379/374
[58] Field of Search ........................ 379/373, 374, 375

[56] References Cited

U.S. PATENT DOCUMENTS

| | | |
|---|---|---|
| 955,676 | 4/1910 | Oehmen . |
| 1,307,467 | 6/1919 | Van Heusen . |
| 1,905,937 | 11/1933 | Hoag . |
| 2,251,635 | 8/1941 | Riebe .................................. 177/7 |
| 2,269,098 | 1/1942 | Garnett ................................ 177/7 |
| 2,375,281 | 5/1945 | Cameron .............................. 177/7 |
| 4,301,335 | 11/1981 | Jucker et al. ....................... 179/84 |
| 4,721,437 | 1/1988 | Mitamura et al. ................. 379/388 |
| 4,727,572 | 2/1988 | Whitney ............................. 379/374 |
| 4,864,607 | 9/1989 | Mitamura et al. . |

Primary Examiner—James L. Dwyer
Assistant Examiner—Jack Chiang
Attorney, Agent, or Firm—Thomas R. Vigil

[57] ABSTRACT

A telephone ringing device in the form of a simulated bird such as a woodpecker, wherein the bird is adapted to move in a manner similar to that of a live woodpecker tapping a tree trunk when a telephone ringing signal is received.

11 Claims, 2 Drawing Sheets

WOODPECKER SIMULATING TELEPHONE RINGING DEVICE

BACKGROUND OF THE INVENTION

1. Field of the Invention

This invention relates to improvements in signaling devices and particularly to a novel telephone ringing device in the form of a simulated bird, such as a woodpecker, wherein the bird is adapted to move in a manner similar to that of a live woodpecker tapping a tree trunk when a telephone ringing signal is received.

2. Description of the related art including information disclosed under 37 CFR §§1.97-1.99.

Heretofore various telephone ringing devices have been proposed. Several examples of such ringing devices are disclosed in the following U.S. Patents:

| U.S. Pat. No. | Patentee |
| --- | --- |
| 955,676 | Oehmen |
| 1,307,467 | Van Heusen |
| 1,905,937 | Hoag |
| 2,251,635 | Riebe |
| 2,269,098 | Garnett |
| 2,375,281 | Cameron |
| 4,301,335 | Jucker et al |
| 4,721,437 | Mitamura et al |
| 4,864,607 | Mitamura et al |

U.S. Pat. No. 2,375,281 discloses a simulated bird, such as a woodpecker, to generate an audible signal in place of a conventional telephone bell or chime. Relay coils 19 within a housing are activated to interrupt the current and effect a knocking audible signal.

U.S. Pat. No. 1,905,937 discloses a manually-operated, mechanical woodpecker which is arranged to deliver a rapid succession of loud taps on a resonator, for use as a door bell.

U.S. Pat. No. 2,269,098 discloses a mechanically operated woodpecker as a door bell, having a sound producing bar in a sound chamber.

U.S. Pat. Nos. 4,721,437 and 4,864,607 disclose animated annunciator apparatus in the form of a teddy bear, which appear to speak when a telephone is answered. The teddy bear appears to move in synchronism with the speech of a calling party.

U.S. Pat. No. 955,676 discloses a telegraphic-sounder utilizing a vertical solenoid.

U.S. Pat. No. 1,307,467 discloses a chime attachment for telephone signal boxes. The chime attachment produces a vibrating sound capable of variation in tone and effect, in place of a normal telephone sound.

U.S. Pat. No. 2,251,635 discloses a telephone chiming apparatus having an alternating current magnet actuated striking hammer, to strike a chime bar when actuated.

U.S. Pat. No. 4,301,335 discloses a visual telephone annunciator ringing indicator for rendering visible a standard telephone ringing signal. Such a device is particularly adapted to deaf subscribers or in locations where numerous telephone receivers are located in a small area, for example, in small offices where closely located desks each are provided with telephones which ring frequently.

SUMMARY OF THE INVENTION

According to the present invention there is provided a telephone ringing device comprising a base, a movably mounted bird coupled to the base, and circuit means for receiving a telephone ringing signal coupled to the base and the bird for causing the bird to tap on the base when a telephone ringing signal is received.

DESCRIPTION OF THE PREFERRED EMBODIMENT(S)

Figure 1:
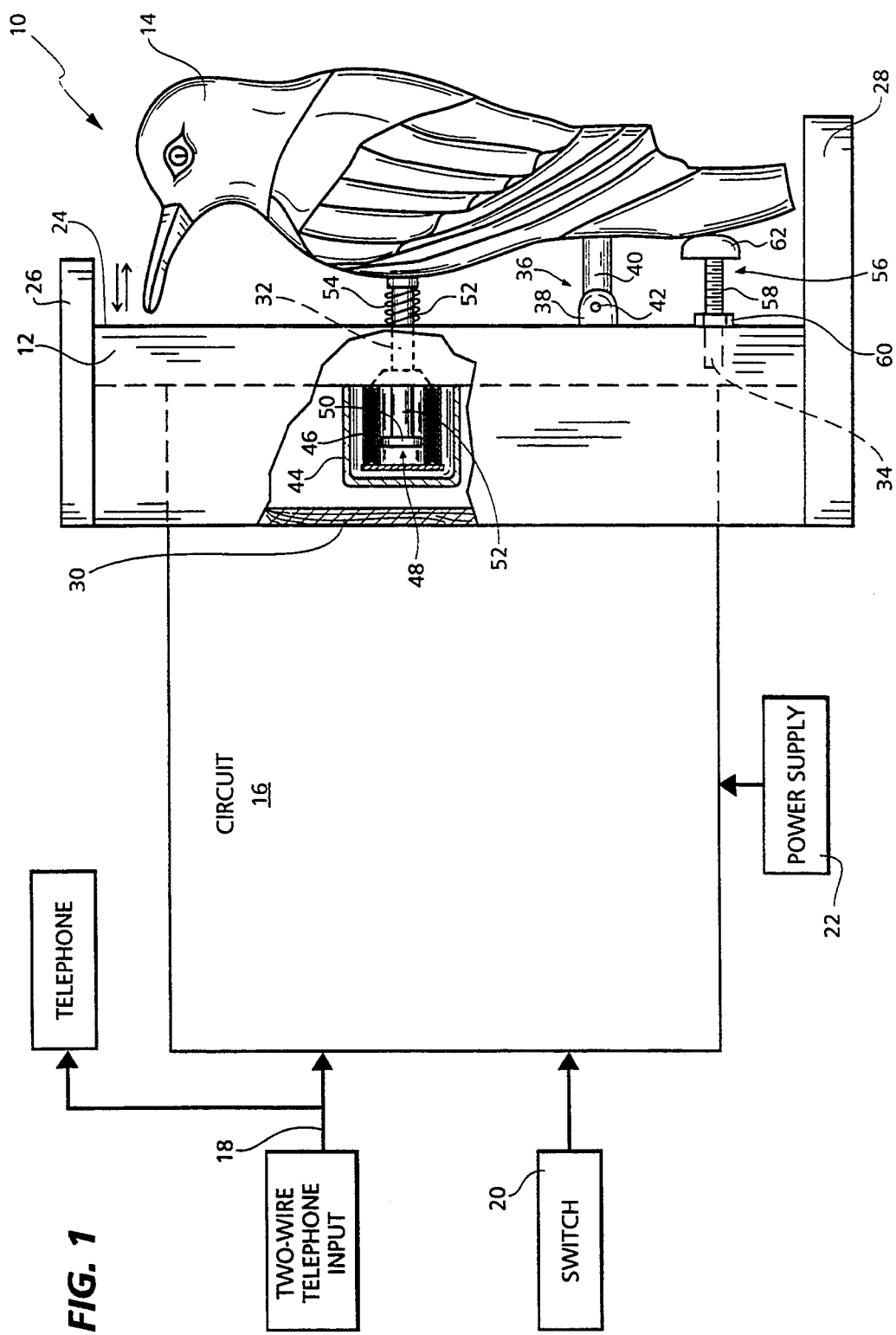
FIG. 1 of the drawings is a side elevational view partially cut away of the telephone ringing device and simplified block circuit diagram therefor of the present invention.
Figure 2:
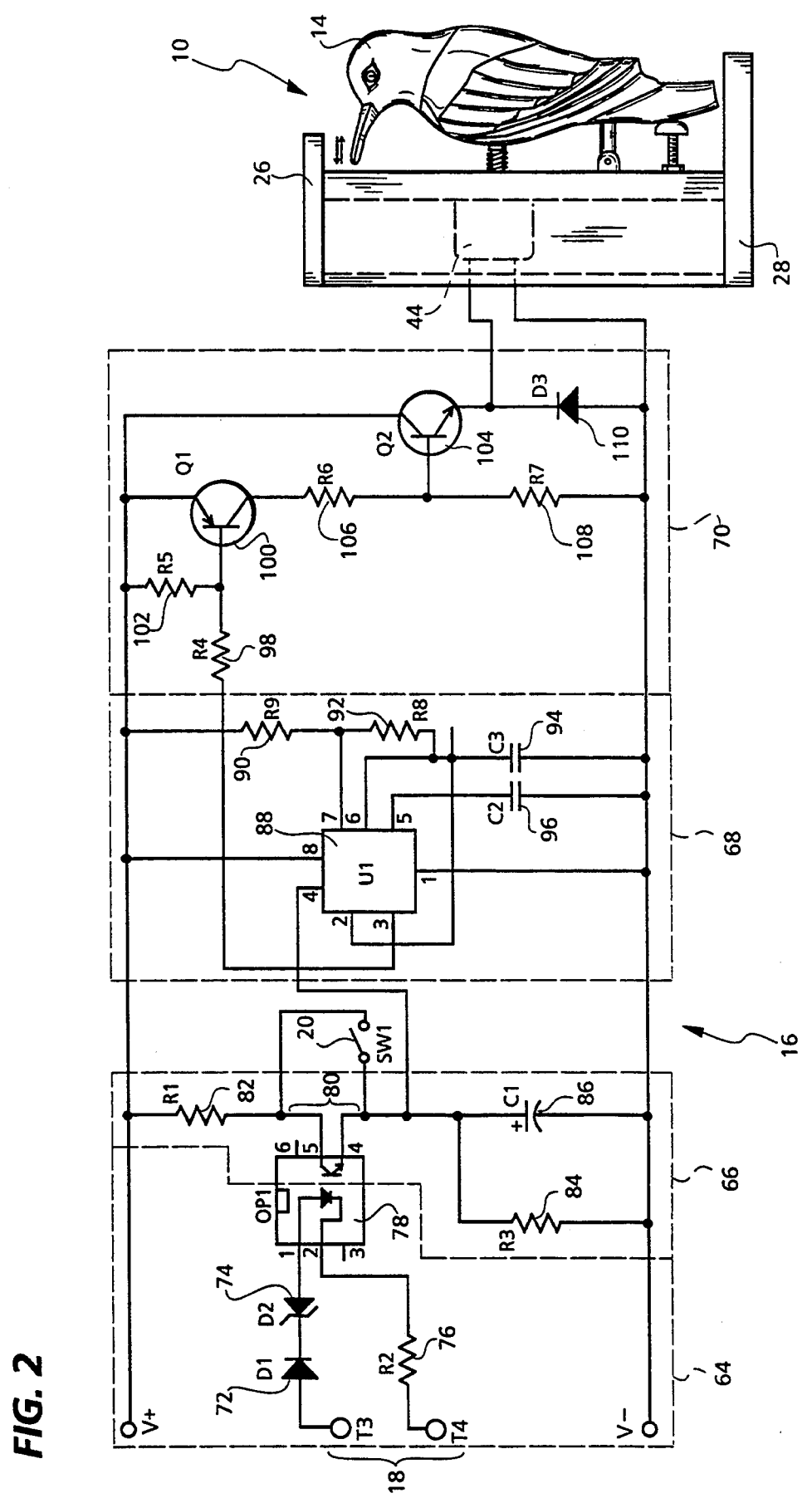
FIG. 2 of the drawings is a schematic circuit diagram for the ringing device shown in FIG. 1.

While this invention is susceptible of embodiments in many forms, there are shown in FIGS. 1 and 2, one embodiment suitable for use in the practice of this invention, with the understanding that the present disclosure is not intended to limit the invention to the embodiment illustrated.

Illustrated in FIG. 1 is a telephone ringing device 10. The device 10 includes a base 12, a movably mounted simulated bird 14 coupled to the base 12, and circuit means 16 for receiving a telephone ringing signal coupled to the base 12 and the bird 14 for causing the bird 14 to tap on the base 12 when a telephone ringing signal is received. The bird is a simulated woodpecker which is adapted to move in a manner similar to that of a live woodpecker tapping a tree trunk, when a telephone ringing signal is received.

The circuit 16 includes a two wire telephone input 18, a manual actuating switch 20 for testing or other purposes, for causing the bird to tap on the base when actuated. The circuit also includes a conventional power supply 22. The device 10 can be battery operated or plugged into a standard outlet. The input 18 is coupled in parallel to a telephone, as a primary or alternate ringing device.

The base 12 of the device 10, includes a front portion with head and foot boards 26 and 28, respectively, and a rear cover 30 having a hole (not shown) for hanging the device 10 on a wall, for example. Alternately, the foot board 28 provides a planar surface for allowing the device 10 to be set on a table or stand.

The front portion 24 includes a first port 32 for allowing a linkage to pass therethrough and a second port or indentation 34 adapted to receiving a sound adjustment means. Between first and second ports 32 and 34 on the front portion 24 is a pivot mechanism 36 for allowing the bird 14 to pivot thereabout, as indicated by the arrows near the beak of the bird 14 in FIG. 1.

The pivot mechanism 36 includes a stationary section 38 attached to the front portion 24, a movable section 40 attached to a lower mid section of the bird 14, and a pivot pin 42 attaching the stationary and movable sections 38 and 40 together.

The circuit 16 includes an actuating mechanism 44, both of which are attached to the rear side of front portion 24. Although not illustrated in the drawings, circuit 16 includes a circuit board with the associated circuitry, attached to the rear side of the front portion 24 opposite the pivot mechanism 36, to minimize the vibration from the tapping in circuit 16.

The actuating mechanism 44 can include, but is not limited to, a DC motor, a piezo-electric actuator, or a linear, tubular, or rotary solenoid. In one embodiment, the actuating mechanism is a tubular solenoid 46 for ease of manufacture, simplicity in design and reliability. The solenoid 44 includes stationary windings 46 and a reciprocal linkage 48, which includes a plunger 50 and rod section 52. When actuated, the plunger 50 is pulled inwardly in a direction toward the rear cover 30 for an instant, thereby resulting in the pulling of the rod 52 and bird 14 toward and contacting the front portion 24 in a tapping motion, simulating a woodpecker.

In normal operation, a burst of signals having a short duration are fed from the circuit 16 to the solenoid 44, resulting in rapid tapping of the bird 14 when energized. As shown, the rod 52 has a spring 54 thereon for biasing the bird 14 away from base 12. When the signal from the circuit 16 ends, the linkage 48 returns to its normal position resulting in the bird 14 moving in a direction away from the base 12, due to the biasing spring 54 pushing force away from the base 14. The signal from the circuit 44 is actually a burst of frequent but short signals, thus causing frequent reciprocation of linkage 48 when the solenoid is energized.

The volume and pitch of the tapping sound is adjusted by a sound stroke adjustment mechanism 56. The adjustment mechanism 56 includes a screw 58 mounted in the front portion 24 of the base 12, a locking nut 60 on the screw 58 adjacent the front portion 24 and a rubber cap 62 at the outer end of the screw 58. The closer the cap 62 is adjusted toward the base 12, the louder the bird 14 taps because the distance the bird 14 travels is increased.

Illustrated in FIG. 2 is a schematic circuit diagram of the circuit 16 of FIG. 1. The circuit 16 includes an input filter network 64, filter timer circuit 66 coupled to the network 64, a stable multivibrator circuit 68 coupled to the timer circuit 66, dual stage switch mode power amplifier circuit 70 coupled to the multivibrator circuit and to the actuating mechanism 44. The circuit 16 is coupled in parallel with a conventional telephone and telephone lines.

The input filter network 64 includes a two wire telephone input 18, T3 and T4. Connected to T3 is a rectifier diode 72 and, in series therewith, a Zener diode 74 which acts as a voltage dependent switch which only allows a ringing signal to pass, such as about 75 volts or more and prevents a talking voltage to pass (i.e. less than 75 volts to pass). Coupled to T4 is a current limiting resistor 76 to protect the downstream circuitry.

After traveling through diodes 72 and 74 and resistor 76, the signals from T3 and T4 are fed to the input pins 1 and 2 of an opto-coupler 78, respectively. The opto-coupler 78 switches ON when receiving a telephone ringing signal from T3 and switches OFF when receiving a talking voltage of less than a threshold voltage of about 75 volts. The opto-coupler 78 output 80 includes pins 4 and 5, which are connected in parallel to a switch 20. When receiving a ringing voltage, the opto-coupler 78 switches on, which allows V+ to flow from pin 5 to pin 4. This can also be accomplished by closing switch 20.

The filter timer circuit 66 includes the output 80 of opto-coupler 78 and resistors 82 and 84 which make up a voltage divider network to provide proper voltage to the multivibrator circuit 68 input and a capacitor 86 for dampening the voltage fed into pin 4 of the multivibrator chip 88. The capacitor 86 acts as a low pass filter to inhibit interference.

The stable multivibrator circuit 68 includes a multivibrator chip 88 to provide a square wave output having a certain frequency and pulse width effecting the pecking frequency. The output of multivibrator chip 88 is coupled to resistors 90 and 92 and a capacitor 94. The values of the resistors 90 and 92 and the capacitor 94 determine the pulse width and frequency of the output from chip 88, resulting in the tapping pulse width and frequency. A capacitor 96 is utilized to protect and stabilize the chip The output of the chip 88 at pin 3 is fed to the dual stage switch mode power amplifier circuit 70. The signal passes through a base-current-controlling resistor 98 and into the base of a transistor 100, the first stage of the amplifier circuit 70. Coupled between V+ and the base of the transistor 100 is a base grounding or turn off resistor 102.

The second stage of the power amplifier circuit 70 includes a transistor 104, which includes a base current limiting resistor 106, limiting the current to the base thereof, a turnoff resistor 108 coupled from the base to the V− voltage, and coupled between the collector and V− is a diode 110, to protect against flyback voltages or spikes. The solenoid 44 is connected in parallel with a diode 110. When energized, the power amplifier circuit 70 receives a signal from pin 3 of chip 88 supplied to the base of the transistor 100, which allows V+ to travel through resistor 106 to the base of transistor 104, in turn allowing current to flow from the emitter to the collector of transistor 104, resulting in energizing of the solenoid 44 in parallel with diode 110.

The output signal of the power amplifier circuit 70, is fed to the windings 46 of the solenoid 44, with a fixed pulse width and frequency, thereby causing the linkage 48 to reciprocate resulting in the bird 14 simulating the tapping of a real woodpecker.

Between pulses or when not activated by the ringing signal from input filter network 64, the windings 46 of solenoid 44 are not energized, causing the bird 14 to move pivotally away from the front portion 24 due to the biasing spring 54.

Although only one embodiment of this invention has been shown and described, it is to be understood that modifications and substitutions, as well as rearrangements and combinations of the preceding embodiment can be made by those skilled in the art without departing from the teachings of this invention. Accordingly, the scope of the invention is only to be limited as necessitated by the accompanying claims.

I claim:

1. A telephone ringing device comprising:

a base;

a movably mounted simulated woodpecker having a beak and being coupled to said base;

circuit means for receiving a telephone ringing signal coupled to said base and to said simulated woodpecker for causing said simulated woodpecker to tap with its beak on said base with a telephone ringing signal is received, said circuit means including a solenoid attached to said base and to a middle portion of said simulated woodpecker;

pivot means for allowing said simulated woodpecker to pivot there about, said pivot means being located between and attached to said base and to said woodpecker; and, sound stroke adjustment means for adjusting the pitch and volume of said tapping sound of said simulated woodpecker extending outwardly from said base in proximity to a lower portion of said simulated woodpecker.

2. The device of claim 1 wherein said pivot means comprises a stationary section attached to said base, a movable section attached to said simulated bird and a pivot pin coupling said stationary and said movable sections together.

3. The device of claim 1 wherein said solenoid comprises stationary windings and a reciprocal linkage connected to said simulated woodpecker, said linkage reciprocating when said circuit means receives a telephone ringing signal.

4. The device of claim 3 wherein said linkage is connected to said simulated woodpecker in a mid-section thereof.

5. The device of claim 3 wherein said linkage includes a plunger section in proximity to said windings and a rod section extending away from said plunger section substantially through the middle of said windings, said rod section extending to said simulated bird from said plunger.

6. The device of claim 5 wherein said linkage is surrounded by a biasing means biasing said simulated woodpecker away from said base.

7. The device of claim 1 wherein said circuit means includes input filter means response to a telephone ringing signal and nonresponsive to a voice receiving signal.

8. The device of claim 1 wherein said circuit means is coupled in parallel with a telephone.

9. The device of claim 1 wherein said circuit means includes means for amplifying a telephone ringing signal and an actuator coupled to the output thereof, said amplifier means applying a burst of signals to said actuator when a telephone ringing signal is received.

10. The device of claim 1 wherein said circuit means includes an actuating mechanism for causing said simulated woodpecker to move toward said base, an input filter network for coupling to telephone lines, a filter timer circuit coupled to said input filter network, a multivibrator circuit coupled to said filter timer circuit, and a dual stage power amplifier circuit coupled to said multivibrator circuit and to said actuating mechanism.

11. The device of claim 1 wherein said circuit means includes a manual actuating switch for causing said simulated woodpecker to tap on the base when actuated.

* * * * *